(12) United States Patent
Ishikawa et al.

(10) Patent No.: US 11,071,937 B2
(45) Date of Patent: Jul. 27, 2021

(54) CERAMIC POROUS BODY AND METHOD FOR PRODUCING THE SAME, AND DUST COLLECTING FILTER

(71) Applicant: NGK INSULATORS, LTD., Nagoya (JP)

(72) Inventors: Masaki Ishikawa, Nagoya (JP); Takahiro Tomita, Nagoya (JP); Kenji Morimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 132 days.

(21) Appl. No.: 16/364,703

(22) Filed: Mar. 26, 2019

(65) Prior Publication Data
US 2019/0299145 A1    Oct. 3, 2019

(30) Foreign Application Priority Data
Mar. 30, 2018 (JP) .............................. JP2018-069309

(51) Int. Cl.
*F01N 3/022* (2006.01)
*B01D 46/24* (2006.01)

(52) U.S. Cl.
CPC ........ *B01D 46/2429* (2013.01); *F01N 3/0222* (2013.01); *B01D 2046/2433* (2013.01); *B01D 2046/2437* (2013.01); *B01D 2046/2496* (2013.01)

(58) Field of Classification Search
CPC ........ B01D 46/2429; B01D 2046/2433; B01D 2046/2437; B01D 2046/2496; F01N 3/0222
USPC .............................. 55/523; 422/180; 428/116
See application file for complete search history.

(56) References Cited

U.S. PATENT DOCUMENTS

| | | |
|---|---|---|
| 2003/0134084 A1 | 7/2003 | Ichikawa et al. |
| 2004/0033893 A1 | 2/2004 | Tomita et al. |
| 2016/0271548 A1* | 9/2016 | Kikuchi .............. C04B 38/0006 |

FOREIGN PATENT DOCUMENTS

| | | |
|---|---|---|
| JP | 2002-201082 A1 | 7/2002 |
| JP | 2002-356383 A1 | 12/2002 |

* cited by examiner

*Primary Examiner* — Tom P Duong
(74) *Attorney, Agent, or Firm* — Burr & Brown, PLLC

(57) ABSTRACT

A ceramic porous body includes skeleton portions; and pore portions formed between the skeleton portions, the pore portions being capable of allowing a fluid to flow therethrough. In a cross section parallel to a flow direction of the fluid, the skeleton portions have a ratio of a skeleton length of 40 μm or more of 15% or less in a direction orthogonal to the flow direction of the fluid.

13 Claims, 6 Drawing Sheets

[FIG. 1]
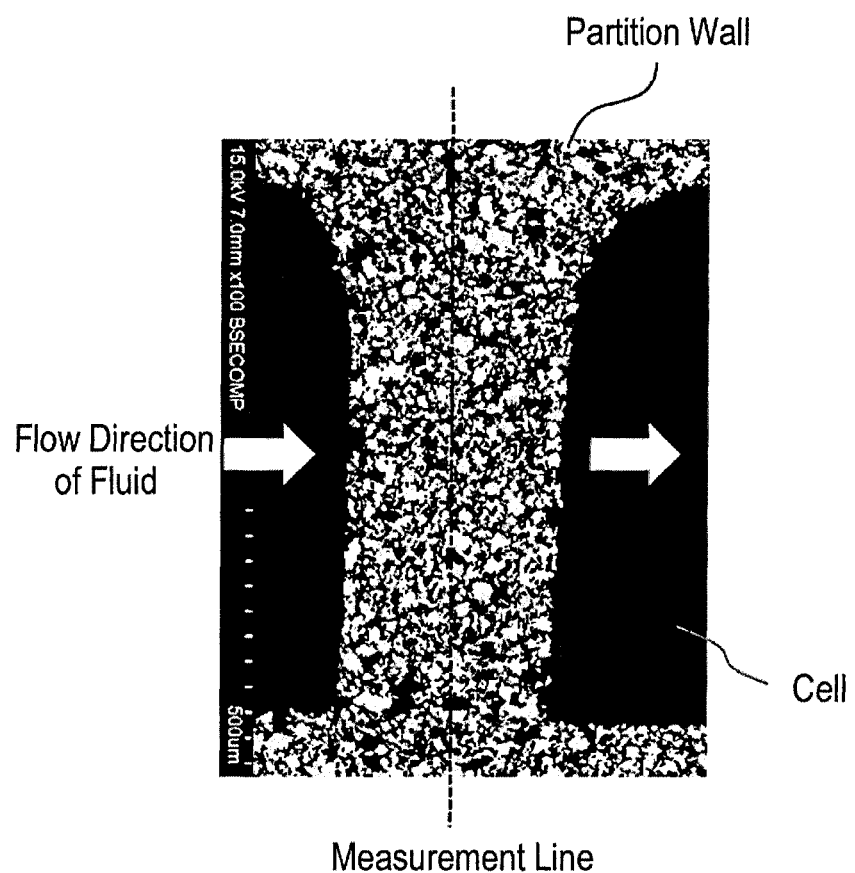

[FIG. 2]
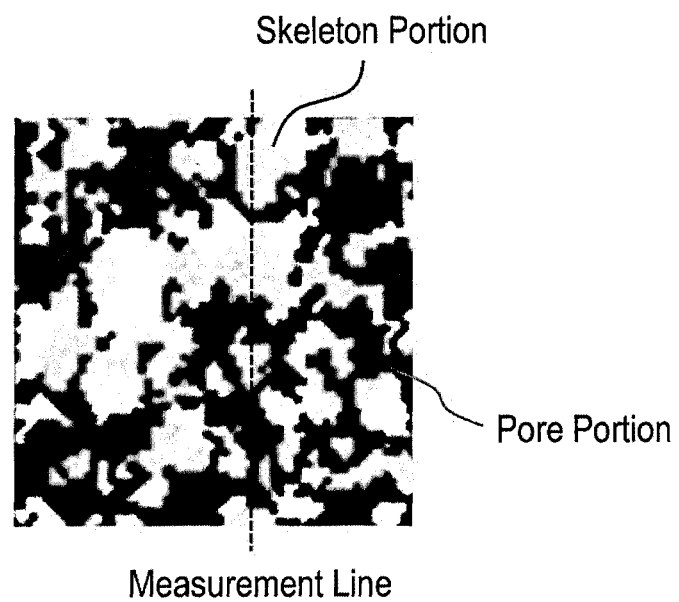

[FIG. 3]
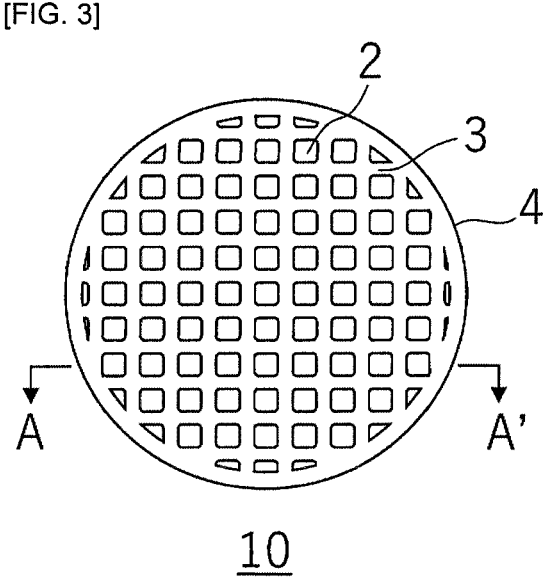

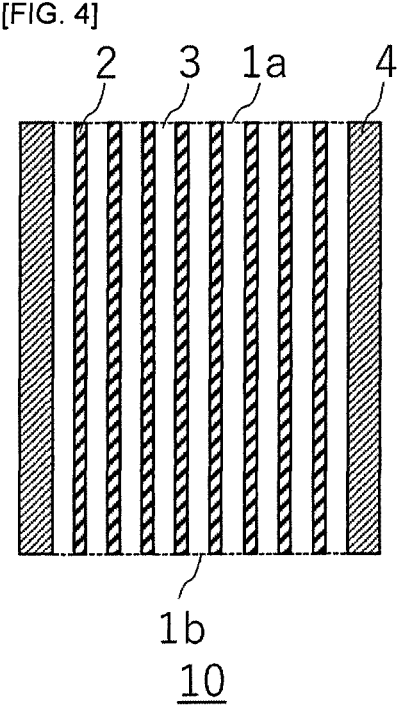
[FIG. 4]

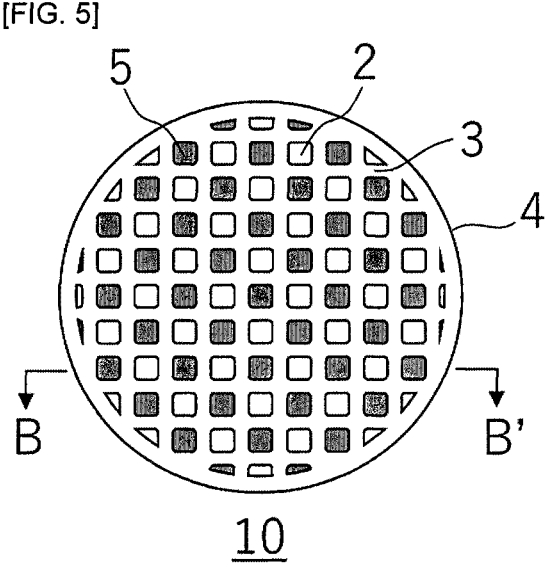
[FIG. 5]

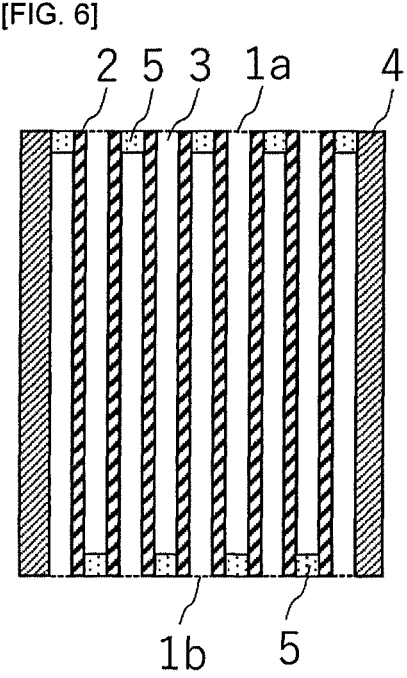
[FIG. 6]

CERAMIC POROUS BODY AND METHOD FOR PRODUCING THE SAME, AND DUST COLLECTING FILTER

TECHNICAL FIELD

The present invention relates to a ceramic porous body and a method for producing the same, as well as a dust collecting filter.

BACKGROUND ART

A large amount of particulate substances such as soot (also referred to as "particulate matters" or "PMs") is contained in exhaust gases discharged from internal combustion engines such as diesel engines and gasoline engines, and various combustion devices. When the PMs are directly discharged into the atmosphere, environmental pollution is caused. Therefore, an exhaust system for an exhaust gas is equipped with a dust collecting filter (also referred to as "particulate filter") for collecting the PMs. For example, the dust collecting filter used for purifying exhaust gases discharged from diesel engines or gasoline engines includes a diesel particulate filter (DPF), a gasoline particulate filter (GPF), and the like. In such DPF and GPF, a ceramic porous body is used that has a honeycomb structure in which a plurality of cells penetrating from a first end face to a second end face to form flow paths for an exhaust gas are defined by partition walls.

Further, the exhaust gas as stated above also contains harmful substances such as NOx, CO and HC. Catalytic reaction is widely used when reducing an amount of harmful substances in the exhaust gas to purify the exhaust gas. In the purification of the exhaust gas utilizing such a catalytic reaction, a ceramic porous body having the above honeycomb structure is also used as a catalyst support for supporting a catalyst.

As the ceramic porous body used for the dust collecting filter is used, particulate matters such as soot are deposited on a surface or an inner side of the ceramic porous body. This results in an increased pressure loss of the ceramic porous body, so that a collecting capacity as a dust collection filter will not be sufficiently obtained. Therefore, to regenerate the collecting capacity as a dust collecting filter, a treatment is carried out for burning and removing the particulate matters deposited on the surface or inner side of the porous ceramic body at regular intervals.

However, the conventional ceramic porous body has problems that, since it has low thermal conductivity, local heat generation occurs when the particulate matters deposited on the surface or inner side of the porous ceramic body is burned, and the particulate matters cannot be sufficiently removed.

Therefore, the Applicant has proposed a ceramic porous body including: skeleton portions including an aggregate such as silicon carbide and a binding material such as metallic silicon; and pore portions formed between the skeleton portions, the pore portions being capable of allowing a fluid to flow therethrough (Patent Document 1).

CITATION LIST

Patent Literature

Patent Document 1: Japanese Patent Application Publication No. 2002-201082 A

SUMMARY OF INVENTION

Technical Problem

The ceramic porous body disclosed in Patent Document 1 focuses on improvement of thermal conductivity, and does not sufficiently discuss a pressure loss during use (for example, in a state where particulate matters are deposited). Therefore, the ceramic porous body has a problem that the pressure loss may be increased during use at an early stage, and the regeneration treatment has to be frequently performed. In particular, the ceramic porous body used for the dust collecting filter is often used in a state where particulate matters are deposited. Therefore, there is a need for suppressing an increase in pressure loss in a state where the particulate matters are deposited.

The present invention has been made to solve the above problems. An object of the present invention is to provide a ceramic porous body that can suppress an increase in pressure loss upon use, and a method for producing the same, as well as a dust collecting filter.

Solution to Problem

As a result of intensive studies to solve the above problems, the present inventors have found that, in a cross section of a ceramic porous body in a direction parallel to a flow direction of a fluid, a ratio of a skeleton length of 40 μm or more in a direction orthogonal to the flow direction of the fluid is closely related to the pressure loss upon use. Based on the findings, the present inventors have found an increase in the pressure loss upon use can be suppressed by controlling the ratio of the skeleton length, and have completed the present invention.

Thus, the present invention relates to:
a ceramic porous body comprising: skeleton portions; and pore portions formed between the skeleton portions, the pore portions being capable of allowing a fluid to flow therethrough,
wherein, in a cross section parallel to a flow direction of the fluid, the pore skeleton portions have a ratio of a skeleton length of 40 μm or more of 15% or less in a direction orthogonal to the flow direction of the fluid.

The present invention also relates to:
a method for producing a ceramic porous body, comprising: forming a green body containing an aggregate having an average particle diameter of 50 μm or less and a binder, and then firing the resulting formed body at a temperature of from 1330 to 1580° C. or less.

Furthermore, the present invention relates to a dust collecting filter comprising the ceramic porous body.

Advantageous Effects of Invention

According to the present invention, it is possible to provide a ceramic porous body that can suppress an increase in pressure loss upon use; and a method for producing the same; as well as a dust collecting filter.

BRIEF DESCRIPTION OF DRAWINGS

FIG. 1 is an SEM image obtained by subjecting a sample of a ceramic porous body according to Embodiment 2 to binarization processing.

FIG. 2 is a partially enlarged view of the binarized SEM image in FIG. 1.

FIG. 3 is a plan view of a ceramic porous body according to Embodiment 2 as viewed from a first end face side.

FIG. 4 is a cross-sectional view showing a cross section taken along the line A-A' in FIG. 3.

FIG. 5 is a plan view of a ceramic porous body according to Embodiment 3 as viewed from a first end face side.

FIG. 6 is a cross-sectional view showing a cross section taken along the line B-B' in FIG. 5.

DESCRIPTION OF THE PREFERRED EMBODIMENTS

Hereinafter, preferred embodiments of a ceramic porous body and a method for producing the same as well as a dust collecting filter according to the present invention will be specifically described, but the present invention should not be construed as being limited thereto, and various modifications and improvements may be made based on the knowledge of a person skilled in the art, without departing from the spirit of the present invention. A plurality of elements disclosed in each embodiment can form various inventions by proper combinations. For example, some elements may be deleted from all the elements described in the embodiments, or elements of different embodiments may be optionally combined.

Embodiment 1

The porous ceramic body according to the present embodiment includes: skeleton portions; and pore portions formed between the skeleton portions and capable of allowing a fluid to flow therethrough.

Generally, in a ceramic porous body, a large number of coarse skeleton portions hinders flow of a fluid by the coarse skeleton portions. As a result, the fluid does not smoothly flow through the pores, so that the pressure loss is increased. Conversely, a large number of fine skeleton portions decreases the size of the pores formed between the skeleton portions, so that it is difficult for the fluid to flow. Thus, the pressure loss and the ease of flow of the fluid in the porous ceramic body are mainly affected by the size and ratio of the skeleton portions.

Therefore, according to the ceramic porous body of the present embodiment, in a cross section in a direction parallel to a flow direction of a fluid, a ratio of a skeleton length of 40 μm or more in a direction orthogonal to the flow direction of the fluid is controlled to 15% or less, in terms of ensuring a balance between suppression of an increase in a pressure loss and ease of flowing of the fluid.

Here, the reason why the skeleton length is 40 μm or more is that it has a significant effect on the pressure loss and the ease of flowing of the fluid. It is preferable that the ratio of the skeleton length of 40 μm or more is lower.

If the ratio of the skeleton length is too high, the fluid does not smoothly flow through the pores, so that the pressure loss is increased. In particular, when particulate matters such as soot are deposited on surfaces or inner sides of the skeleton portions, the pressure loss tends to be increased. Therefore, in terms of suppression of an increase in pressure loss, the upper limit of the ratio of the skeleton length is controlled to 15%, and preferably 14.5%, and more preferably 14%, and even more preferably 13.5%. On the other hand, the lower limit of the ratio of the skeleton length is not particularly limited, but it may be preferably 0.5%, and more preferably 0.3%, and even more preferably 0.1%.

A method of measuring the ratio of the skeleton length is not particularly limited, and the ratio of the skeleton length may be determined as follows. First, a sample having a cut surface in a direction parallel to a flow direction of a fluid is cut out from the ceramic porous body. Then, after embedding the cut surface of the sample in a resin, the cut surface is polished and observed with SEM (a scanning electron microscope). In the SEM observation, imaging may be performed at magnifications of 100 (1280×960 pixels). The skeleton length is then measured by analyzing it using an image analysis software "Image-Pro Plus 7.0J (trade name)" available from Media Cybernetics. Specifically, the resulting SEM image is subjected to binarization processing into skeleton portions and other portions (pore portions) to create a binarized image. Then, in the binarized image, ten measurement lines each having a length of 1000 μm are drawn in the direction orthogonal to the flow direction of the fluid, and all of the skeleton lengths on the measurement lines are measured. Then, the ratio of the skeleton length of 40 μm or more is calculated from the equation: "the number of skeleton length of 40 μm or more/the total number of skeleton lengths measured×100".

A material for forming the skeleton portions is not particularly limited, but the skeleton portions may preferably include an aggregate. A shape of the aggregate is not particularly limited, and it may maintain a shape (particle shape) at a stage of the raw material, or it may be changed from the shape at the stage of the raw material. Further, the skeleton portions may be formed by binding aggregates, or the skeleton portions may further include a binding material and the skeleton portions may be bonded to each other via the binding material.

The aggregate is not particularly limited, and a known aggregate in the art may be used. Examples of the aggregate include silicon carbide, aluminum oxide, aluminum titanate, zirconia, metallic silicon and the like. By using such a material, a ceramic porous body having improved strength and improved thermal shock resistance can be obtained. These raw materials may be used alone or in combination of two or more.

An average particle diameter of the aggregate is preferably 50 μm or less, and more preferably 25 μm or less. By using the aggregate having such an average particle diameter, coarse skeleton portions will be difficult to be formed, so that an increase in pressure loss can be suppressed while maintaining the flowing of the fluid. Further, the lower limit of the average particle diameter of the aggregate may be, but not particularly limited to, preferably 1 μm, and more preferably 3 μm, and even more preferably 5 μm. The "average particle diameter" as used herein refers to a particle diameter at an integrated value 50% in a particle size distribution obtained by a laser diffraction/scattering type particle size distribution measuring apparatus (LA-950 V2 available from HORIBA, Ltd.).

It should be noted that, as the aggregate, a plurality of aggregates having different average particle diameters may be used. In this case, a ratio of an aggregate having an average particle diameter of 50 μm or less to the entire aggregate is preferably 50% by mass or more, and more preferably 70% or more, in terms of making it difficult to form coarse skeleton portions.

The binding material is dissolved during production (firing) of the porous ceramics body to play a role of binding the aggregates. Therefore, if a ratio of the binding material to the aggregate is too low, the binding material becomes insufficient, so that the strength of the ceramic porous body tends to be decreased. Accordingly, in terms of ensuring the strength of the ceramic porous body, the content of the binding material is preferably 10% by mass or more, and more preferably 15% by mass or more, and still more preferably 20% by mass or more, based on the total amount of the aggregate and the binding material. On the other hand, if the ratio of the binding material to the aggregate is too high, a pinning effect cannot be sufficiently obtained, so that coarse skeleton portions tend to be formed. As a result, skeleton portions having a fine structure cannot be obtained, so that it will be difficult for the fluid to flow through the pores. Therefore, the content of the binding material is preferably 40% by mass or less, and more preferably 35% by mass or less, and even more preferably 30% by mass or less, based on the total amount of the aggregate and the binding material, in terms of ensuring ease of flowing of the fluid.

As used herein, the term "pinning effect" means that the aggregate inhibits sintering of the binding materials.

The binding material is not particularly limited as long as it is dissolved to bond the aggregates during the production (firing) of the ceramic porous body, and the binding material known in the art may be used. Examples of the binding material include cordierite, metallic silicon and the like. These may be used alone or in combination of two or more.

It should be noted that while cordierite and metallic silicon are used as the aggregate, they also serve as the binding material depending on the type of the aggregate to be used together, a firing temperature, a firing atmosphere, and the like. For example, metallic silicon serves as the binding material when used together with silicon carbide.

Further, it is preferable that the material making up the skeleton portions does not contain a sintering aid. The sintering aid has an action of increasing wettability of the aggregate to the binding material. Therefore, if the sintering aid is contained, a contact area between the aggregate and the binder during the firing will be increased and the pinning effect will be difficult to be obtained. As a result, a large number of coarse skeleton portions tends to be formed.

Non-limiting examples of the sintering aid include compounds containing alkaline earth metal elements. Specific examples of the sintering aid include fluorides, carbides, chlorides, silicides, carbonates, hydroxides, oxides, inorganic acid salts and organic acid salts of calcium and/or strontium.

A porosity of the ceramic porous body is preferably 30% or more, and more preferably 35% or more. The porosity in such a range allows for ensuring easy flow of a fluid (a filtration rate) when the ceramic porous body is used as a filter. The porosity of the ceramic porous body may preferably be 50% or less, and more preferably 45% or less. The porosity in such a range allows suppression of an increase in pressure loss when the ceramic porous body is used as a filter.

The "porosity" as used herein refers to a porosity measured by mercury porosimetry according to JIS R 1655: 2003.

The ceramic porous body preferably has an average pore diameter of 3 μm or more, and more preferably 5 μm or more. The average pore diameter in such a range can allow suppression of an increase in pressure loss when the ceramic porous body is used as a filter. In particular, even if the particulate matters are deposited on the ceramic porous body, it is difficult to increase the pressure loss. Also, the average pore diameter of the ceramic porous body is preferably 20 μm or less, and more preferably 18 μm or less. The average particle diameter in such a range can allow suppression of leakage of particulate matters when the ceramic porous body is used as a filter.

Herein, the "average pore diameter" as used herein means a pore diameter at an integrated value of 50% in a pore distribution determined by mercury porosimetry according to JIS R 1655: 2003.

The ceramic porous body having the above features can be produced by forming a green body containing an aggregate having an average particle diameter of 50 μm or less and a binder, and then firing the resulting formed body at a temperature of from 1330 to 1580° C. or less. Further, when the skeleton portions include the binding material, the binding material is further added to the green body.

An average particle diameter of the binding material used as the raw material for the green body may be, but not particularly limited to, preferably not more than the average particle diameter of the aggregate. If the average particle diameter of the binding material is too high, the pinning effect cannot be obtained, and the aggregates will be bonded by a thicker binding part of the binding material. As a result, the pressure loss of the ceramic porous body tends to be increased.

The binder is not particularly limited, and known binders in the technical field can be used. Examples of the binder include organic binders such as methyl cellulose and hydroxypropoxyl methyl cellulose. These can be used alone or in combination of two or more.

An amount of the binder incorporated is not particularly limited, but it is generally from 2 to 30% by mass, relative to the total amount of the aggregate and the binding material.

Further, to adjust the porosity of the ceramic porous body, a pore former may be added to the green body. The pore former is not particularly limited, and any known pore former in the technical field can be used. Examples of the pore former include graphite, wheat flour, starch, phenol resins, polymethylmethacrylate, polyethylene, polyethylene terephthalate, and the like. These can be used alone or in combination of two or more. An amount of the pore former added may be adjusted as needed according to its type and degree of porosity, and is not particularly limited.

The green body can be obtained by mixing and kneading the above raw materials. A method for mixing and kneading the raw materials is not particularly limited, and it can be carried out by a method known in the art. For example, the mixing and kneading of the raw materials can be carried out using a kneader, a vacuum green body kneader or the like.

Similarly, a method for forming the green body is not particularly limited, and it can be carried out by a method known in the art.

The formed body may be calcined before the firing in order to remove (degrease) the binder contained in the formed body. The calcination is preferably performed at a temperature lower than a temperature at which the binding material is melted. More particularly, it may be once held at a predetermined temperature of from about 150 to 700° C., or it may be calcined by slowing down a rate of temperature rising to 50° C./hour or less in the predetermined temperature range.

The method of being once held at the predetermined temperature may be holding only at one temperature level or holding at a plurality of temperature levels, depending on the type and amount of the binder used. Further, in case of holding at plurality of temperature levels, the holding times may be the same as or different from each other. Similarly, the method of slowing down the rate of the temperature rising may be slowing only in a certain temperature zone or in a plurality of zones. Further, in the case of the plurality of zones, the rates may be the same as or different from each other.

An atmosphere of the calcination may be an oxidizing atmosphere. However, when the formed body contains a large amount of binder, the binder vigorously burns out with oxygen during the calcination and the temperature of the formed body may be sharply increased. Therefore, the calcination may be carried out in an inert atmosphere such as $N_2$ and Ar to suppress abnormal temperature rise of the formed body. The suppression of the abnormal temperature rise is an important control when a raw material having a higher thermal expansion coefficient (i.e., which is weak against thermal shock) is used. When the binder is blended in an amount of 20% by mass or more based on the total amount of the main raw materials (the aggregate and the binding material), the calcination is preferably carried out in an inert atmosphere. In addition to the case where the aggregate is silicon carbide, even in the case where oxidation at elevated temperature is concerned, the calcination is preferably carried out in the inert atmosphere, at least at a temperature higher than or equal to an oxidation initiating temperature, to suppress oxidation of the formed body.

The calcination and subsequent firing may be carried out in different steps in the same furnace or different furnaces or may be a continuous step in the same furnace. Although the former method is also a preferred approach when the calcination and the firing are performed in different atmospheres, the latter method is also preferable from the standpoint of the total firing time, operating cost of the furnace and the like.

To obtain a structure in which the aggregates are bonded by the binding materials, the binding material is required to be softened. For example, when metallic silicon is used as the binding material, the metallic silicon has a melting point of 1410° C., so that the firing temperature is 1330° C. or more, and preferably 1430° C. or more. On the other hand, at a temperature of more than 1580° C., evaporation of metallic silicon tends to proceed to be difficult to form the bond via metallic silicon. Therefore, the sintering temperature is 1580° C. or less, and preferably 1560° C. or less.

In addition, the firing time may be, but not particularly limited to, preferably from 1 to 4 hours, in terms of stably obtaining the pinning effect.

The atmosphere of the firing may be determined according to the types of the aggregate and the binding material to be used. For example, when using an aggregate and a binding material which are concerned about oxidation at an elevated temperature, a non-oxidizing atmosphere such as $N_2$ and Ar is preferred, at least in a temperature range higher than or equal to an oxidation initiating temperature.

In the ceramic porous body according to the present embodiment produced as described above, the ratio of the skeleton length of 40 μm or more in the direction orthogonal to the flow direction of the fluid is controlled within the appropriate range, in the cross section in the direction parallel to the flow direction of the fluid, so that the fluid can be allowed to flow through the pores smoothly, and it is difficult for the pressure loss to be increased even if the particulate matters are deposited.

Embodiment 2

A porous ceramic body according to the present embodiment has a honeycomb structure in which a plurality of cells penetrating from a first end face to a second end face to form fluid flow paths are defined by partition walls. In the ceramic porous body having such a honeycomb structure, the partition walls 3 correspond to the ceramic porous body. Further, in the ceramic porous body having the honeycomb structure, "a cross section in a direction parallel to a flow direction of a fluid" refers to a cross section in a direction orthogonal to a cell extending direction, and "a flow direction of a fluid" refers to a thickness direction of the partition wall.

In the ceramic porous body according to the present embodiment, the measurement of the ratio of the skeleton length of 40 μm or more in the direction orthogonal to the fluid flowing direction may be carried out by the same method as described in Embodiment 1, after cutting the ceramic porous body in a direction orthogonal to a cell extending direction (an axial direction of the ceramic porous body having a honeycomb structure) to obtain a sample. Here, FIG. 1 shows a SEM image obtained by subjecting the sample of the ceramic porous body of the present embodiment to binarization processing. Further, FIG. 2 shows a partially enlarged view of the binarized SEM image in FIG. 1. Ten measurement lines (each having a length of 1000 μm) as shown in FIGS. 1 and 2 are drawn in the direction orthogonal to the flow direction of the fluid, and all of the skeleton lengths on the measurement lines are measured.

The ceramic porous body according to the present embodiment is the same as the ceramic porous body of Embodiment 1, with the exception that the former has a predetermined honeycomb structure. Therefore, the descriptions of the configuration common to Embodiment 1 will be omitted here, and only portions different from those of Embodiment 1 will be described.

FIG. 3 is a plan view of the ceramic porous body according to the present embodiment as view from the first end face side. FIG. 4 is a cross-sectional view showing a cross section taken along the line A-A' in FIG. 3.

As shown in FIGS. 3 and 4, a ceramic porous body 10 includes partition walls 3 that defines a plurality of cells 2 penetrating from a first end face 1a to a second end face 1b to form fluid flow paths. Further, an outer peripheral wall 4 is formed on an outer peripheral surface of the ceramic porous body 10.

A thickness of each partition wall 3 is not particularly limited, but it may preferably be from 100 to 500 μm, and more preferably from 150 to 400 μm, and even more preferably from 150 to 300 μm. The partition wall having such a thickness allows suppression of an increase in pressure loss while ensuring the strength of the partition walls 3.

A cell density in the ceramic porous body 10 is not particularly limited, but it may preferably be from 15 to 100 cells/cm², and more preferably from 30 to 65 cells/cm², and still more preferably from 30 to 50 cells/cm². Such a cell density allows improvement of a trapping efficiency while suppressing an increase in pressure loss when the ceramic porous body is used as a filter.

The shape of the cell 2 is not particularly limited, and it may be a shape known in the art. As used herein, "the shape of the cell 2" refers to the shape of each cell 2 in a cross section in a direction orthogonal to an extending direction of the cell 2. Examples of the shape of the cell 2 include a square, a hexagon, an octagon, and the like.

The shape of the ceramic porous body 10 is not particularly limited, and it may be a pillar shape in which end faces (the first end face 1a and the second end face 1b) are circular (a cylindrical shape); a pillar shape in which end faces are oval; and a pillar shape in which end faces are polygonal (for example, pentagonal, hexagonal, heptagonal, octagonal, etc.); and the like.

The length from the first end face 1a to the second end face 1b of the ceramic porous body 10 and the size of the cross section orthogonal to the extending direction of the cell 2 may be optionally set according to working conditions and use application of the ceramic porous body, and is not particularly limited.

In the ceramic porous body according to the present embodiment, a catalyst for purifying an exhaust gas may be supported on at least one of the surface of each partition wall 3 and the pores of each partition wall 3. The catalyst that can be used is known in the art. Examples of the catalyst include noble metals such as platinum, palladium, rhodium, iridium and silver; and oxides such as alumina, zirconia, titania, ceria and iron oxide. These can be used alone or in combination of two or more.

The ceramic porous body 10 having the above features can be produced in the same method as that of Embodiment 1, with the exception that a formed body is produced by extrusion molding. The extrusion molding can be carried out using a die having a desired cell shape, partition wall thickness and cell density. The formed body having a honeycomb structure thus obtained may be dried before firing. A non-limiting drying method may be hot air drying, microwave drying, dielectric drying, reduced pressure drying, vacuum drying, freeze drying and the like. Among them, the dielectric drying, the microwave drying and the hot air drying may be carried out alone or in combination with one another. The drying may be carried out under conditions at a drying temperature of from 30 to 150° C. for a drying time of from 1 minute to 2 hours, but not particularly limited to thereto. As used herein, the "drying temperature" refers to a temperature of an atmosphere in which the drying is carried out.

Embodiment 3

A ceramic porous body according to the present embodiment is different from the ceramic porous body according to Embodiment 2 in that the honeycomb structure of the former further includes opening portions of predetermined cells on the first end face and plugged portions provided at the opening portions of the remaining cells on the second end face. Therefore, descriptions of the configuration common to Embodiment 2 will be omitted herein, and only portions different from those of Embodiment 2 will be described.

FIG. 5 is a plan view of the ceramic porous body of the present embodiment as view from the first end face side. FIG. 6 is a cross-sectional view showing a cross section taken along the line B-B' in FIG. 5.

As shown in FIGS. 5 and 6, the ceramic porous body 10 according to the present embodiment includes opening portions of predetermined cells 2 on a first end face 1a and plugged portions 5 provided at the opening portions of the remaining cells 2 on a second end face 1b. The ceramic porous body thus configured can be used as a particulate filter for purifying exhaust gases discharged from internal combustion engines or various combustion devices.

When producing the ceramic porous body 10 provided with the plugged portions 5, the opening portions of the cells 2 of a formed body having a honeycomb structure or a dried body obtained by drying the formed body are plugged with a plugging material. The method for plugging the opening portions of the cells 2 may employ a method for filling the opening portions of the cells with the plugging material. The method for filling with the plugging material can be carried out in accordance with a conventionally known method for a honeycomb structure provided with plugged portions 5. For a plugged portion-forming raw material for forming the plugged portion 5, a plugged portion-forming raw material may be used, which is used for a conventionally known method for producing a honeycomb structure.

EXAMPLES

Hereinafter, while the present invention will be more specifically described with reference to Examples, the present invention is not limited to these Examples.

Example 1

750 g of silicon carbide powder having an average particle diameter of 16 μm was mixed with 250 g of metallic silicon powder having an average particle diameter of 6 μm to obtain a ceramic raw material. To the ceramic raw material were added 70 g of a binder (methyl cellulose) and water, kneaded in a kneader, and then kneaded in a vacuum green body kneader to obtain a green body. The green body thus obtained was formed into a quadrangular pillar shaped honeycomb structure having a length of one side of the end face of 30 mm, a thickness of the partition wall of 300 μm, and a cell density of 46.5 cells/cm$^2$, by means of an extruder. The resulting formed body was then subjected to microwave drying and then dried with hot air at 80° C. to obtain a dried body. The resulting dried body was then degreased in air at 450° C. for 5 hours. The degreased dried body was then fired in an Ar atmosphere at 1450° C. for 2 hours to obtain a ceramic porous body.

Example 2

A ceramic porous body was obtained in the same method as that of Example 1, with the exception that the average particle diameter of the silicon carbide powder was changed to 24 μm.

Example 3

A ceramic porous body was obtained in the same method as that of Example 1, with the exception that the firing temperature was changed to 1550° C.

Example 4

A ceramic porous body was obtained in the same method as that of Example 1, with the exception that mixed powder of 550 g of silicon carbide powder having an average particle diameter of 18 μm and 200 g of silicon carbide powder having an average particle diameter of 31 μm was used as the silicon carbide powder.

Example 5

A ceramic porous body was obtained in the same method as that of Example 1, with the exception that the average particle diameter of the silicon carbide powder was changed to 31 μm, and the average particle diameter of the metallic silicon powder was changed to 2 μm, and the firing temperature was changed to 1380° C.

Example 6

A ceramic porous body was obtained in the same method as that of Example 1, with the exception that the average particle diameter of the silicon carbide powder was changed to 50 μm, the average particle diameter of the metallic silicon powder was changed to 2 μm, and the firing temperature was changed to 1380° C.

Comparative Example 1

A ceramic porous body was obtained in the same method as that of Example 1, with the exception that an average particle diameter of the silicon carbide powder was changed to 31 μm.

Comparative Example 2

A ceramic porous body was obtained in the same method as that of Example 1, with the exception that the average particle diameter of the silicon carbide powder was changed to 50 μm, and the average particle diameter of the metallic silicon powder was changed to 2 μm.

Comparative Example 3

A ceramic porous body was obtained in the same method as that of Example 1, with the exception that the firing temperature was changed to 1600° C.

The ceramic porous bodies obtained in Examples and Comparative Examples as described above were subjected to the following evaluations.

(Ratio of Skeleton Length of 40 μm or More)

Each ceramic porous body was cut in a direction orthogonal to the extending direction of the cell to obtain a sample. Then, after embedding the cut surface of the sample in a resin, the cut surface was polished and observed with SEM (a scanning electron microscope). In the SEM observation, imaging was performed at magnifications of 100 (1280×960 pixels). Analysis was then performed using an image analysis software "Image-Pro Plus 7.0 J (trade name)" available from Media Cybernetics. For the analysis, first, the resulting SEM image was subjected to binarization processing into skeleton portions and other portions (pore portions) to create a binarized image. Then, in the binarized image, ten measurement lines each having a length of 1000 μm were drawn in the direction orthogonal to the flow direction of the fluid, and all of the skeleton lengths on the measurement lines were measured. Then, the ratio of the skeleton length of 40 μm or more was calculated from the equation: "the number of skeleton length of 40 μm or more/the total number of skeleton lengths measured×100".

(Porosity)

The porosity was measured using a mercury porosimeter (AUTOPORE IV9500 available from Micromeritics).

(Average Pore Diameter)

The pore diameter at the integrated value of 50% in the pore distribution was determined using a mercury porosimeter (AUTOPORE IV9500 available from Micromeritics).

(Pressure Loss with Soot)

The pressure loss with soot means a value of a difference (P2−P1) between a pressure loss (P1) when the soot is not deposited and a pressure loss (P2) after depositing the soot.

The pressure loss with soot was measured as follows. First, air at 0.15 m³/min was allowed to flow through each ceramic porous body in a state where the soot was not trapped, and each ceramic porous body was measured for the after/before pressure difference (pressure loss P1). Soot generated by a soot generator ("CAST 2" available from TOKYO DYLEC CORP.) was deposited in each ceramic porous body in an amount of 0.1 g/L. Air at 0.15 m³/min was then passed through each ceramic porous body in which the soot was deposited, and a pressure difference (pressure loss P2) at that time was measured. Subsequently, the pressure loss with soot was calculated from the equation: P2−P1. When allowing air to flow, plugging was previously applied to each ceramic porous body such that air flowed in a direction parallel to the thickness direction of the partition wall.

The above evaluation results are shown in Table 1.

TABLE 1

|  | Ratio of Skeleton Length of 40 μm or more (%) | Porosity (%) | Average Pore Diameter (μm) | Pressure Loss with Soot (kPa) |
| --- | --- | --- | --- | --- |
| Example 1 | 4.5 | 46 | 7 | 0.25 |
| Example 2 | 11.1 | 45 | 8 | 0.28 |
| Example 3 | 14.3 | 43 | 9 | 0.40 |
| Example 4 | 11.5 | 44 | 9 | 0.35 |
| Example 5 | 3.8 | 38 | 4 | 0.35 |
| Example 6 | 6.6 | 38 | 6 | 0.43 |
| Comparative Example 1 | 18.5 | 37 | 11 | 0.50 |
| Comparative Example 2 | 22.1 | 37 | 12 | 0.62 |
| Comparative Example 3 | 17.9 | 42 | 10 | 0.49 |

As shown in Table 1, the ceramic porous bodies of Examples 1 to 4 having a ratio of a skeleton length of 40 μm or more in a range of from 0.5 to 15% each had smaller pressure loss with soot as compared with the ceramic porous bodies of Comparative Examples 1 and 2 having a ratio of a skeleton length of 40 μm or more of more than 15%.

As can be seen from the above results, the present invention can provide a ceramic porous body that can suppress an increase in pressure loss upon use; a method for producing the same; and a dust collecting filter.

DESCRIPTION OF REFERENCE NUMERALS 1a first end face
1b second end face
2 cell
3 partition wall
4 outer peripheral wall
5 plugged portion
10 ceramic porous body

What is claimed is:

1. A ceramic porous body comprising:
   skeleton portions; and
   pore portions formed between the skeleton portions, the pore portions being capable of allowing a fluid to flow therethrough,
   wherein, in a cross section parallel to a flow direction of the fluid, the skeleton portions have a ratio of a skeleton length of 40 μm or more of 15% or less in a direction orthogonal to the flow direction of the fluid.

2. The ceramic porous body according to claim 1, wherein the ceramic porous body has a porosity of from 30 to 50%.

3. The ceramic porous body according to claim 1, wherein the ceramic porous body has an average pore diameter of from 3 to 20 μm.

4. The ceramic porous body according to claim 1, wherein the porous ceramic body has a honeycomb structure in which a plurality of cells are defined by partition walls, the cells penetrating from a first end face to a second end face to form flow paths for the fluid.

5. The ceramic porous body according to claim 4, wherein the honeycomb structure comprises opening portions of some of the cells on the first end face and plugged portions provided at the opening portions of the remaining cells on the second end face.

6. The ceramic porous body according to claim 1, wherein the skeleton portions comprise an aggregate having an average particle diameter of 50 μm or less.

7. The ceramic porous body according to claim 6, wherein the aggregate comprises at least one selected from the group consisting of silicon carbide, cordierite, aluminum oxide, aluminum titanate, zirconia and metallic silicon.

8. The ceramic porous body according to claim 6, wherein the skeleton portions further comprise at least one binding material.

9. A method for producing the ceramic porous body according to claim 1, comprising:
    forming a green body containing an aggregate having an average particle diameter of 50 μm or less and a binder, and then firing the resulting formed body at a temperature of from 1330 to 1580° C. or less.

10. The method according to claim 9, wherein the green body further comprises at least one binding material.

11. The method according to claim 9, wherein the green body does not comprise a sintering aid.

12. The method according to claim 10, wherein an amount of the binding material added is from 5 to 30% by mass based on to the total amount of the aggregate and the binding material.

13. A dust collecting filter comprising the ceramic porous body according to claim 1.

* * * * *